United States Patent [19]

Valentine

[11] 3,987,557
[45] Oct. 26, 1976

[54] EDUCATIONAL DEVICE FOR LEARNING THE FUNDAMENTALS OF AN AUTOMOTIVE DRUM BRAKE SYSTEM

[75] Inventor: Charles Glenn Valentine, Stamford, Conn.

[73] Assignee: Xerox Corporation, Stamford, Conn.

[22] Filed: July 30, 1973

[21] Appl. No.: 383,845

Related U.S. Application Data

[63] Continuation-in-part of Ser. No. 345,920, March 29, 1973, abandoned.

[52] U.S. Cl. .................................... 35/13; 35/7 A; 40/142 A
[51] Int. Cl.² .......................................... G09B 25/02
[58] Field of Search .............. 35/7 A, 8 R, 8 A, 9 R, 35/9 A, 9 B, 10, 13, 19 R, 19 A, 30, 48 R; 40/142 A

[56] References Cited
UNITED STATES PATENTS

| | | | |
|---|---|---|---|
| 3,077,696 | 2/1963 | Barnett et al. | 35/19 A X |
| 3,245,156 | 4/1966 | De Bloois et al. | 35/8 A |
| 3,423,846 | 1/1969 | Arend | 35/19 A |
| 3,514,873 | 6/1970 | Stobbe | 35/7 A X |
| 3,538,626 | 11/1970 | Frank | 35/48 R |
| 3,651,592 | 3/1972 | McCormick et al. | 40/142 A |
| 3,654,711 | 4/1972 | Taylor | 35/7 A X |

OTHER PUBLICATIONS

Rosengren, H. J.; *Three–Dimensional Teaching Aids for Trade and Industrial Instruction;* 1961, p. 6.

*Primary Examiner*—Richard C. Pinkham
*Assistant Examiner*—Vance Y. Hum

[57] ABSTRACT

An educational kit for teaching the parts and operation of a typical automotive drum brake assembly is disclosed. The kit commprises audiovisual instructional equipment, a simulator board upon which is graphically depicted indicia representing a schematic diagram of a drum brake assembly, wheel cylinder, and master cylinder, and a plurality of manipulative pieces upon which are graphically depicted schematic diagrams of various parts of the automotive drum brake assembly, or word indicia naming various parts of said system. The pieces are adapted to be positioned on the simulator board such that the user of the kit may graphically depict the assembly, relationship of parts, and operation of a drum brake system.

8 Claims, 9 Drawing Figures

AUDIO VISUAL MEANS

FIG. 6

WORK SHEETS

EDUCATIONAL DEVICE FOR LEARNING THE FUNDAMENTALS OF AN AUTOMOTIVE DRUM BRAKE SYSTEM

This application is a continuation-in-part of applicant's copending application, Ser. No. 345,920, filed Mar. 29, 1973, now abandoned.

BACKGROUND OF THE INVENTION

The present invention relates to a portable, compact and easily assembled educational kit. More specifically, the present invention is directed towards an educational kit for teaching the assembly, relationship of parts and operation of an automotive disc brake system comprising as the essential components thereof an audiovisual instructional means, a simulator board bearing graphic indicia thereon, and a plurality of manipulative pieces bearing graphic indicia thereon, which indicia is relatable to the indicia present on the simulator board such that the student can demonstrate his understanding of the fundamentals of the disc brake assembly by arranging certain of the manipulative pieces on the board in a logical sequence.

A problem of increasing difficulty in the education field is that of providing a relatively simple means for instructing students, whether in the classical elementary or high school subjects, or in the various occupational technologies. The effectiveness of the traditional method of teaching involving the teacher/textbook/student relationship is measured not so much by the qualitative aspects of the information conveyed, but rather by how much of the information conveyed is absorbed, understood and learned by the particular student. In recent year, the trend in education has witnessed the introduction of a number of educational teaching devices generally aimed at the pre-college or pre-high school age group. The most common of these devices are the mechanical or computer devices designed to be used by individual students. The theory behind the increasing use of such devices is that account is made of the individual differences in ability, speed and grasp of subject matter, thereby permitting the student to learn at his own pace and with minimum supervision by the teacher. Some of these devices, such as the video computer type devices, are designed to take over a substantial part of the responsibility for providing and transmitting basic information. Others are designed simply to supplement the teacher's own instructional materials by introducing new dimensions into the learning process whereby, for example, spelling may be associated with pictures of objects, mathematical concepts associated with relative sizes and shapes of objects, or correct responses to questions posed by a computer type device rewarded by permission to proceed.

The advantages of a teaching method using a device geared for the individual whereby both the teacher and the individual may be appraised of the individual's progress are not restricted to the traditional elementary or high school subjects; occupational learning materials that take into account individual differences in ability, speed and grasp of subject matter also have a better chance of being effective. However, at the present time, there are very few educational device available in the community colleges, the junior colleges, the vocational high schools, the trade schools and other special schools where various types of occupational technologies are sought to be taught on a simplified and individualized basis.

Accordingly, it is an object of this invention to provide programmed educational kits which present information using a multimedia approach.

Another object is to provide an educational kit comprising instructional means and simulator means for teaching the assembly, relationship of parts and operation of several fundamental automotive brake assemblies.

Another object is to provide an educational kit which is simple, relatively inexpensive, rugged, easily assembled, relatively portable and easily understood.

Another object is to provide an educational kit designed for use by individual students comprising audio, visual or audiovisual instructional means, a simulator board bearing graphic indicia, and a plurality of manipulative pieces bearing graphic indicia depicting schematic diagrams of a fundamental automotive drum brake assembly, including a wheel cylinder and a master cylinder, or word indicia naming various parts of said system, whereby the student may position the pieces at the appropriate indicia present on the simulator board in response to the instructional means to graphically depict construction of said rear drum brake assembly and physically simulate the operation thereof.

SUMMARY OF THE INVENTION

In accordance with the objects and teachings of the present invention, a simple and effective educational kit or unit for the teaching of an automotive rear drum brake assembly is provided. The unit comprises an instructional means, a simulator board upon which is graphically depicted indicia representing schematic views of an automotive rear drum brake assembly (including parking brake components), wheel cylinder, and a master cylinder, and a plurality of pieces upon which are graphically depicted schematic of various component parts of the automotive rear drum brake system or certain descriptive word indicia relating thereto. The kit may also comprising a display board which provides for storage and easy access to the various pieces when the kit is in use. The kit is designed to present the fundamentals of the automotive drum brake system whereby the student learns the assembly, relationship of parts and operation of said system. This information is conveyed to the student using a programmed multimedia approach whereby the student hears and sees information, performs by answering questions, solving problems and manipulating objects. The kit is designed for individual use or for use by small groups without the need for extensive supervision or participation by an instructor. It permits the student to learn at his own pace and also affords him the chance to capitalize on the way he learns best because he participates in different kinds of learning experiences. He listens to information while viewing a series of related visuals and participates in a manipulative activity which gives him the chance to try doing himself what he has been shown or told how to do. Each time a student learns something new, he responds to this new knowledge or skill to make sure he has learned it correctly. First, he performs an activity such as answering a question, solving a problem or manipulating a device. Then he finds out immediately if the action is correct by comparing the result of this action with the one provided by the program. If the student finds that his answer is correct, this instant feedback and learning reinforcement motivates him to continue learning. If he discovers that his answer is wrong or inadequate, he can stop at that point and find out where his error is.

DETAILED DESCRIPTION OF THE INVENTION

Various kinds of instructional means can be employed with the educational kit of this invention. For example, one of the preferred instruction means is an audiovisual presentation using slides of filmstrips in conjunction with a descriptive audio account of the visuals, presented by means of tapes or audio cassettes. A recorded narrator provides background information relating to an automotive rear drum brake system, including the parts thereof, how the system operates, how it compares with a disc brake system, advantages and disadvantages, and the like. During this audio presentation, a series of synchronized related visuals are shown to the students. These visuals comprise photographs or diagrams of the various rear drum brake parts and how they are assembled, as well as diagrams of the rear drum brake system during various phases of operation. From this illustration of a rear drum brake assembly, the principles and function of a total automotive drum brake system can be understood.

The audiovisual equipment needed will vary depending on the type of instruction to be given. A rear screen projector for small groups, or a projector and screen for a classroom presentation may be used. For the audio presentation, either visual projection equipment with built-in audio capability or a separate cassette recorder may be used. The instructional means provided with the educational kit includes a visual segment available, for example, on 35mm slides or filmstrips, and an audio segment available on cassettes. The supporting equipment is normally not included with the kit.

At various points during the presentation, the student is requested to stop the audiovisual presentation and perform certain activities using the simulator board and pieces associated therewith. For example, he may be requested to position pieces depicting the push rod, the secondary cup, the piston, the primary cup, the pressure chamber, the compensating port, the breathing port and the like in their proper positions relative to the master cylinder diagram present on the simulator board, and label the various components so placed using other pieces bearing indicia naming these parts. The simulator activity thus allows the student to use his hands as a learning tool, as well as his eyes and ears. By performing an activity using the simulator board and its accessories, the learning process is reinforced and the student takes an active part in learning and achieves understanding more quickly.

The simulator board and the accessories are best described with reference to the attached drawings.

DETAILED DESCRIPTION OF THE DRAWINGS

Figure 1:
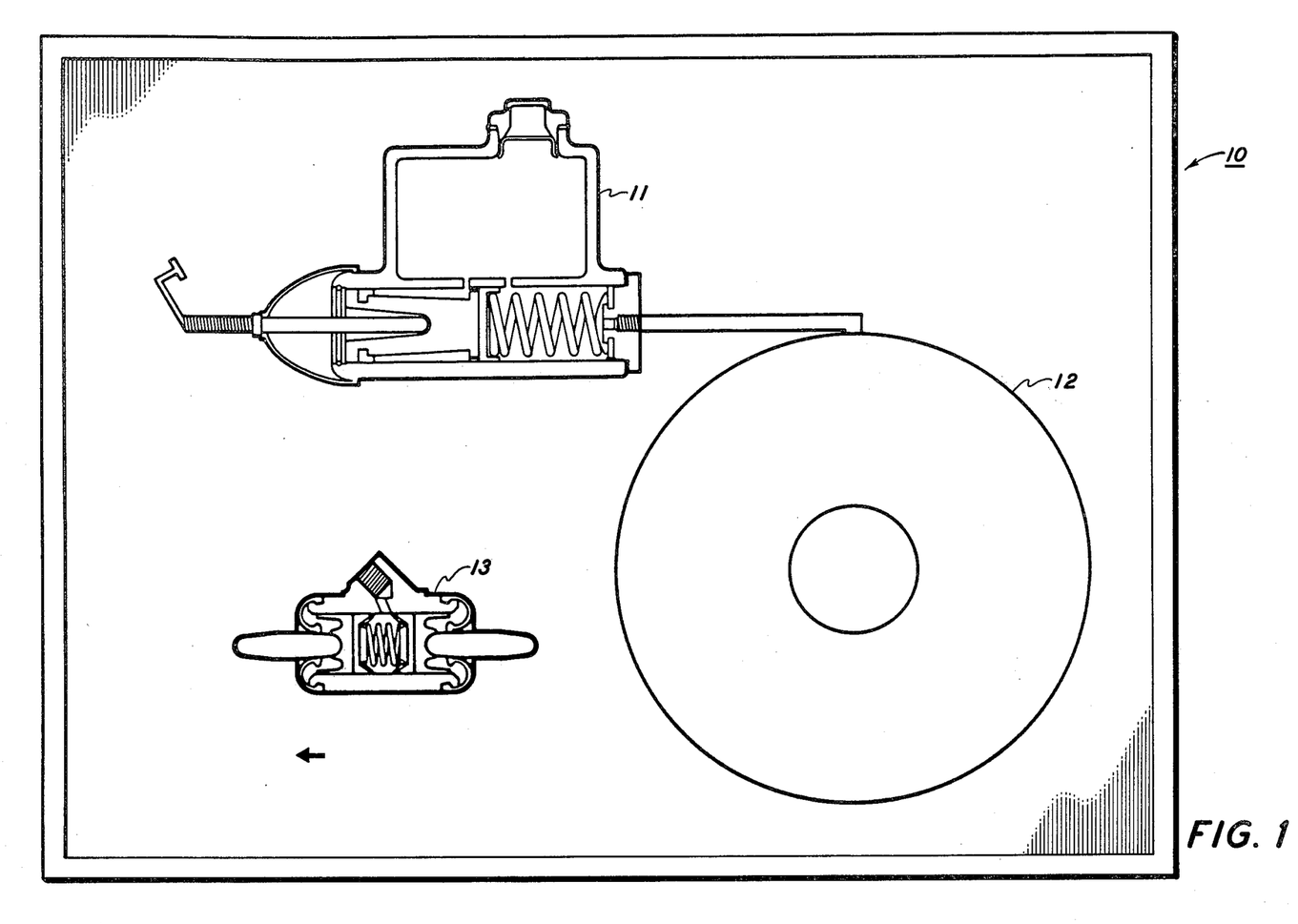
FIG. 1 is a plan view of the simulator board with graphic indicia thereon.

In FIG. 1 the simulator board 10 is shown having printed thereon graphic indicia depicting a schematic side view of a master cylinder 11 in conjunction with a wheel drum 12. Also depicted on the board 10 is a wheel cylinder 13 which is also to be used in conjunction with the wheel drum 12. These diagrams serve as locations for positioning the manipulative pieces in order to simulate the assembly and operation of a rear drum brake system which will be hereinafter described.

The simulator board may be constructed of a magnetically attractive sheet of rigid material such as ferrous metal or a magnetic ferrite plastic, or a thin sheet of ferrous metal coated with a thin layer of plastic material. The surface of the board is painted with a neutral background color such as a white or yellow enamel. The graphic indicia present on the board may be painted over the enamel in a suitable constrasting color such as black. Printing may be accomplished by any suitable means such as, for example, a silk screening process. Alternatively, the indicia may be printed on a sheet of clear plastic adapted to be superimposed over a blank board. Although the simulator board may consist solely of a thin sheet of metal with suitably smooth edges, the metallic sheet may also be laminated to a suitable backing member which imparts suitable rigidity thereto. Thus, the simulator board may comprise a thin sheet comprising ferrous metal having a thickness of about 1/32 inch laminated to a backing member made from a rigid material such as fiberboard, or a resinous material, said backing material having a preferred thickness of about ¼ inch. The dimensions of the simulator board should be such that the board can be conveniently used by the student at a given workplace. Boards having dimensions of about 15 × 20 inches, or appoximately 300 square inches, are particularly suitable.

Figure 2A:
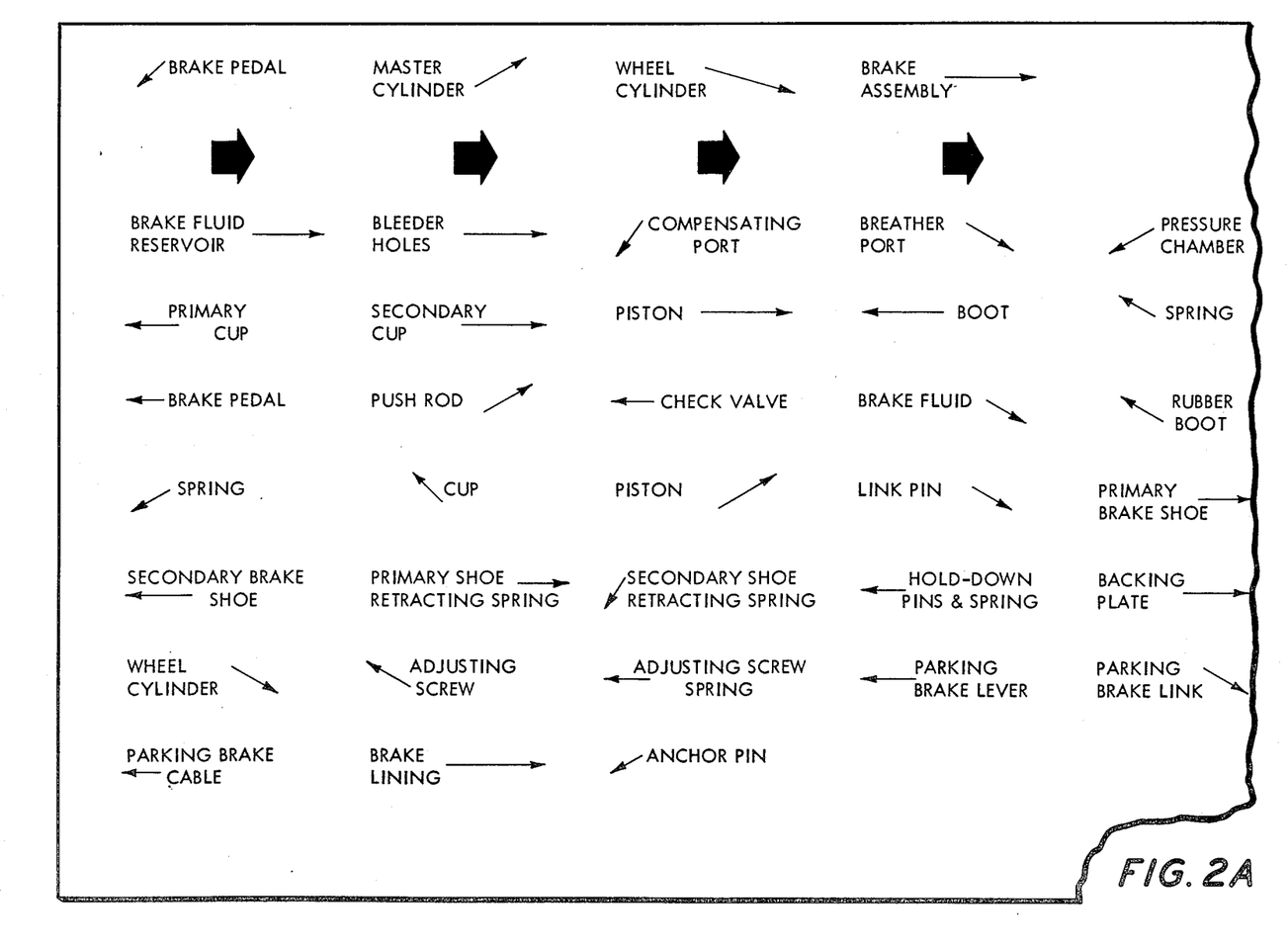
FIG. 2A is a plan view of the left side of the display board with graphic indicia thereon.
Figure 2B:
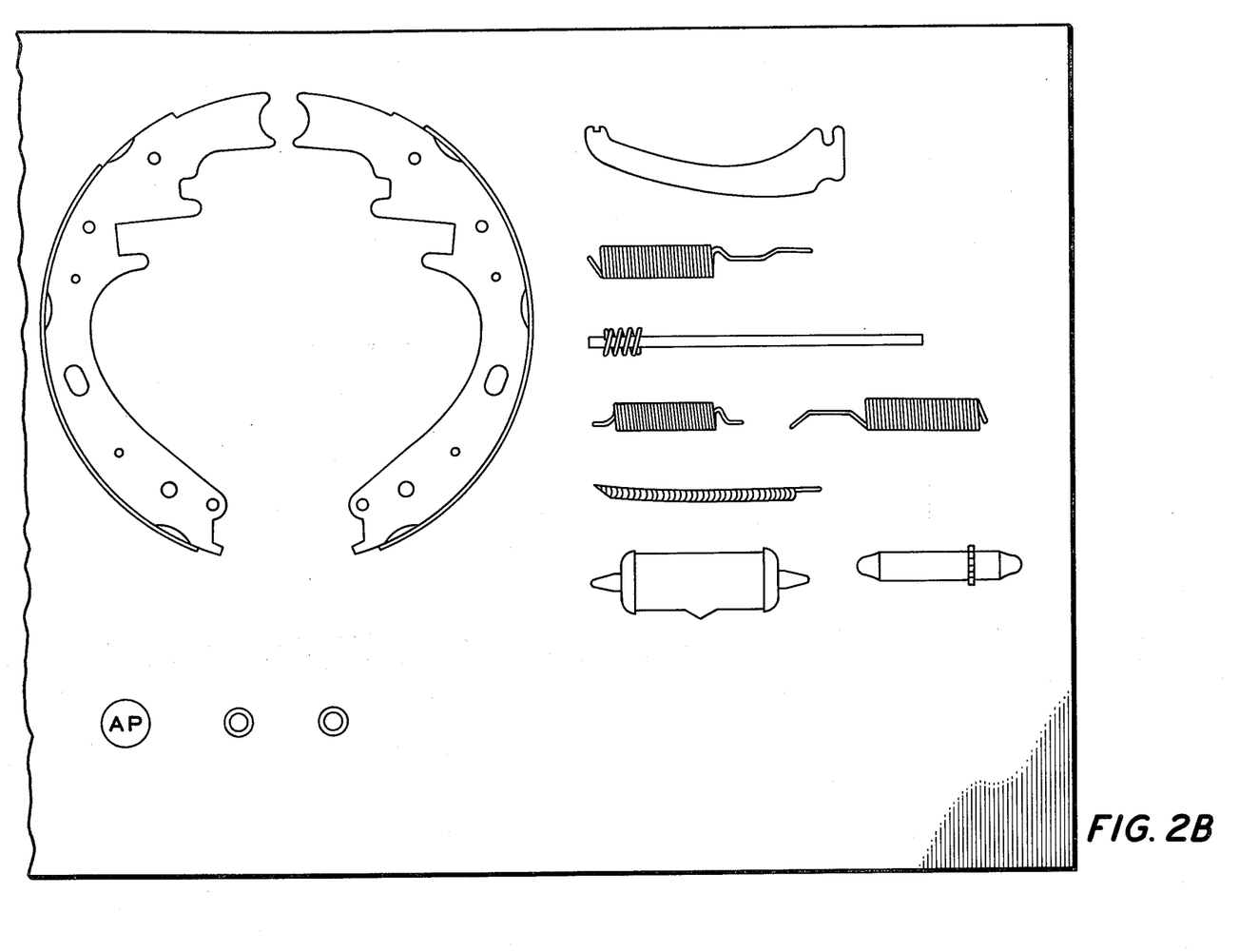
FIG. 2B is a plan view of the right side of the display board with graphic indicia thereon.

In FIGS. 2A and 2B the left and right sides of the display board are shown having printed thereon graphic indicia depicting various parts for an automotive rear drum brake system on the right side, and certain descriptive word indicia on the left side. The display board is also connected on a magnetically attractive material similar to the simulator board and the background indicia may be printed thereon in the same way. The purpose of the display board is to serve as a display and storage area for the magnetically attractive pieces which are used in conjunction with the simulator board. Each of the graphic indicia printed on the display board corresponds to the indicia printed on one of the pieces, thereby facilitating systematic storage and display of the pieces and allowing for quick inspection to determine that all of the pieces are accounted for. The edges of the board should be either smooth or rolled over to prevent injury from sharp edges.

Figure 3:
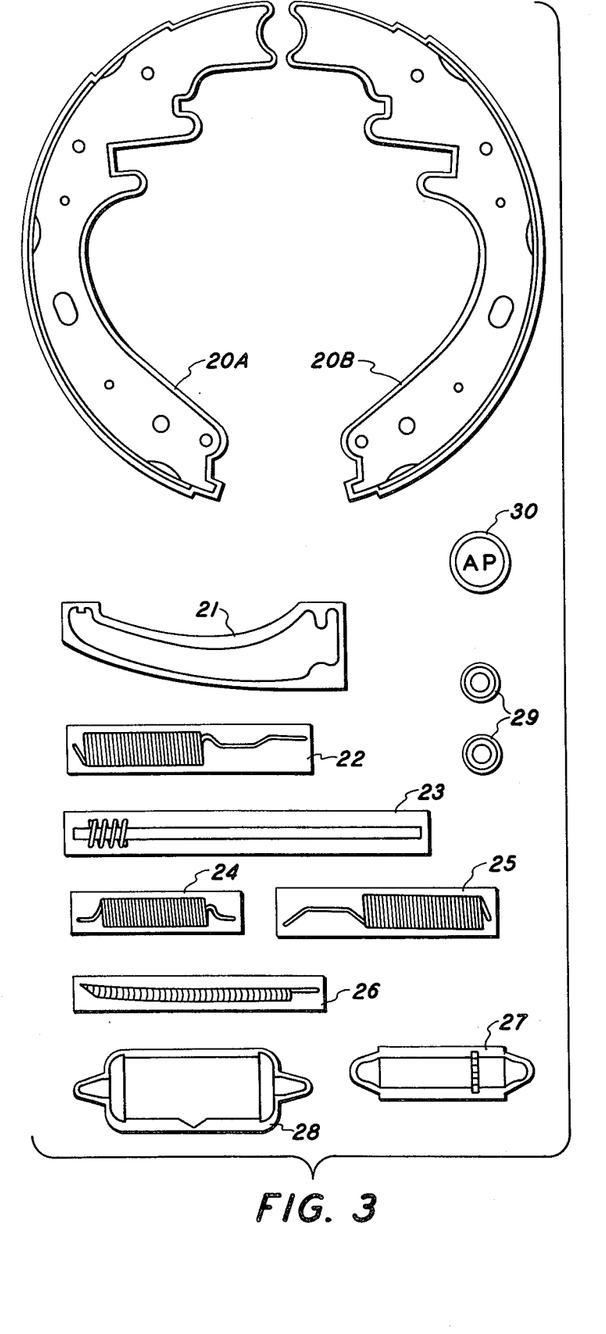
FIG. 3 is a plan view of some of the manipulative pieces having graphic indicia thereon.
Figure 4:
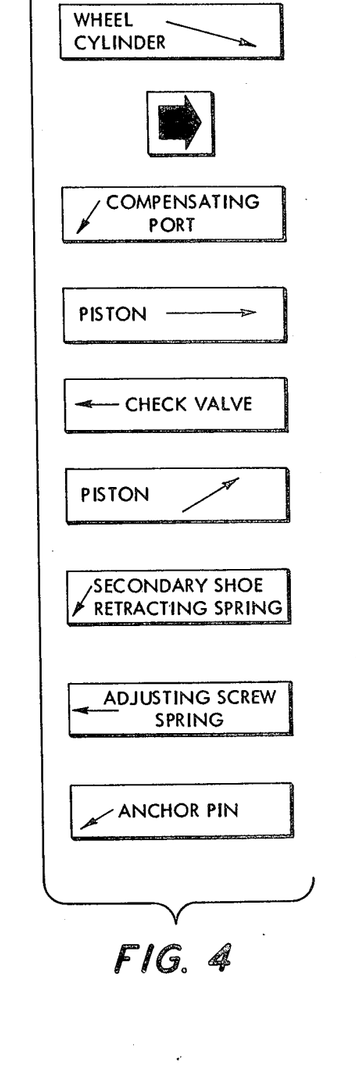
FIG. 4 is a plan view of other manipulative pieces having graphic indicia thereon.

The manipulative pieces used in the educational kit of this invention are shown in FIGS. 3 and 4. Each of these pieces is made of a flat sheet of rigid material such as metal or plastic and has laminated to the underside thereof smaller pieces of a magnetically attractive material such as metal or ferrite plastic. The preferred thickness of the pieces is approximately 1/16 of an inch and the thickness of a smaller section laminated to the underside of the pieces is about 3/32 of an inch.

As shown in FIG. 3, some of the pieces bear indicia depicting schematic side view diagrams of various of the component parts of a rear drum brake system and other of the pieces bear word indicia. Piece 20A depicts a secondary left brake shoe while 20B represents a right primary brake shoe, piece 21 represents a parking brake lever, piece 22 represents a primary retracting spring, piece 23 depicts a parking brake link, piece 24 is a schematic of an adjusting screw spring, piece 25 depicts a secondary retracting spring, piece 26 represents a parking brake cable, piece 27 depicts an adjusting screw, piece 28 represents a wheel cylinder, pieces 29 depict two hold down pins, and piece 30, and designated "AP", depicts an anchor pin.

In FIG. 4 there is shown pieces bearing word indicia such as "BRAKE PEDAL " and "SPRING" and each having an arrow to facilitate designation of the particular part when used in conjunction with the schematic of FIG. 1. Specifically, a piece designating an element of one of the subsystems of FIG. 1 may be placed outside of the system with the arrow appropriately pointing out said element. Also shown are four pieces depicting arrows which may be used to show directions of force in the drum brake system.

All of the depicted pieces in FIG. 3 are adapted for use in conjunction with the automotive drum brake schematic of the simulator board such that the student may simulate the construction and operation of the drum brake system. For example, by properly superimposing brake shoes 20A and 20B, retracting springs 22 and 25, adjusting screw and spring 24 and 27, and wheel cylinder 28 onto the wheel 12 of FIG. 1, a student can visualize and understand the fundamental construction and function of a drum brake. A still broader understanding of the rear drum brake construction and mechanism is afforded the student by proper placement and manipulation of the parking brake pieces 21, 23, and 26 in association with the wheel diagram shown at 12 on the simulator board as will be hereinafter described.

Figure 5:
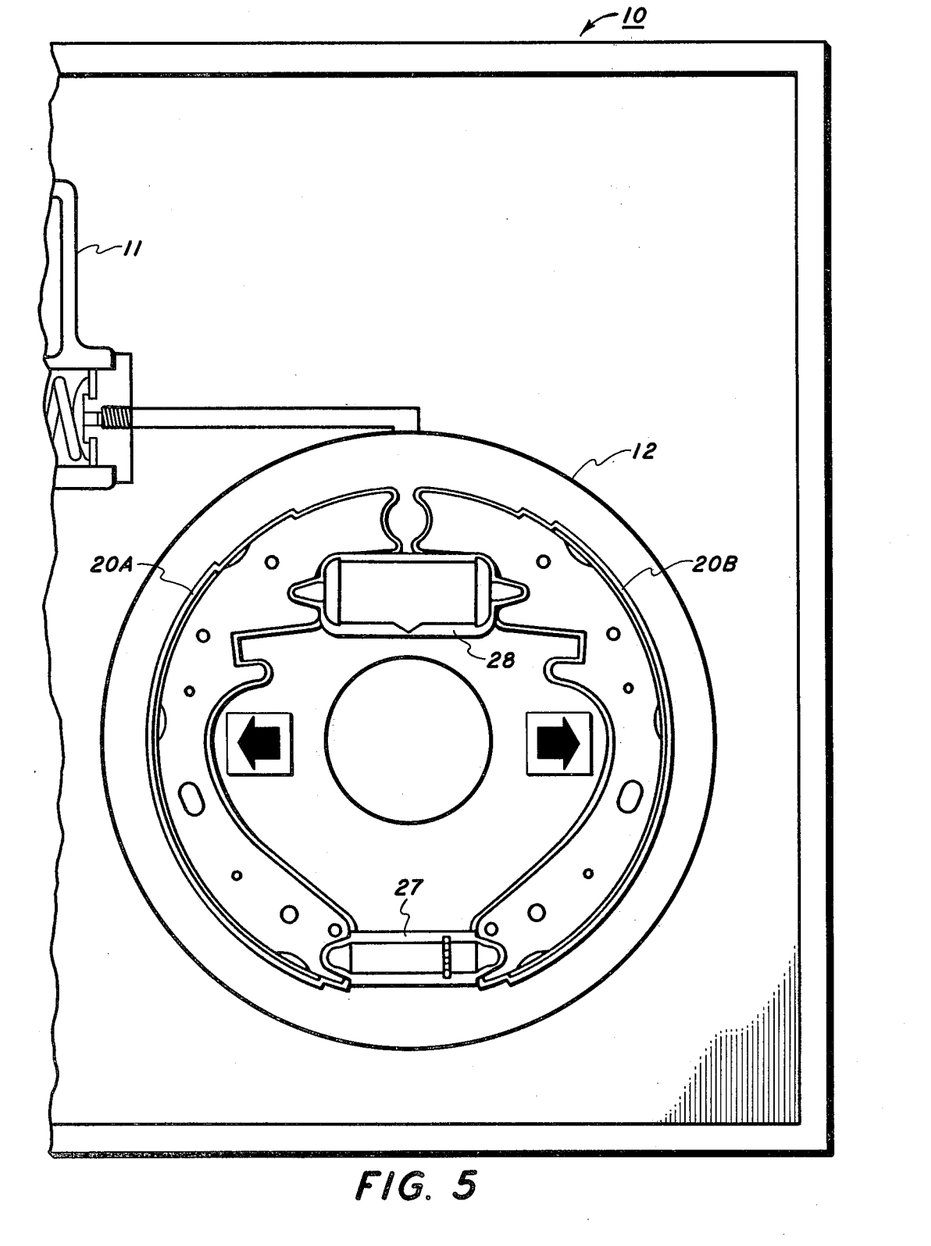
FIG. 5 is a plan view of the simulator board with certain of the manipulative pieces in place.
Figure 6:
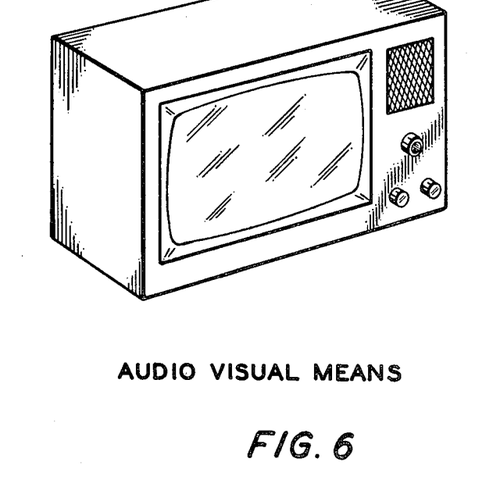
FIG. 6 illustrates generally an audiovisual device suitable for use in the present invention.
Figure 7:
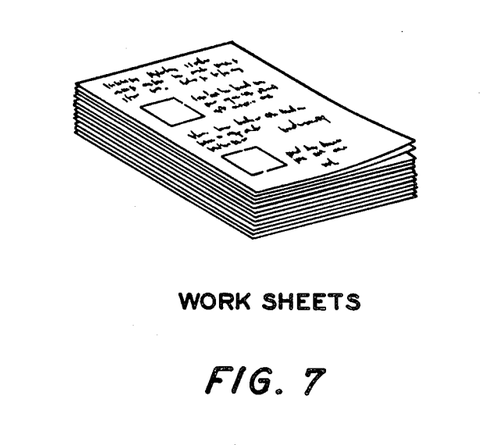
FIG. 7 illustrates generally worksheets in accordance with the present invention.
Figure 8:
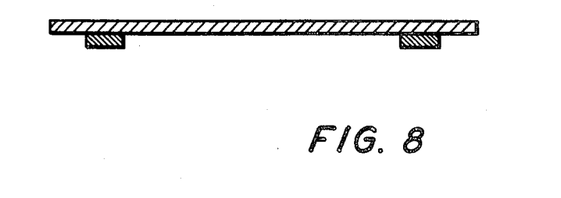
FIG. 8 is a side sectional view of a typical manipulative piece in accordance with the invention showing smaller magnetic sections laminated to the underside of the piece.

In FIG. 5 the simulator board is shown with certain of the manipulative pieces in place. On the wheel portion of the board 12 the general assembly of a drum brake mechanism has been constructed by superimposing within the wheel schematic 12 pieces 20A, 20B, 27 and 28, as well as two arrows indicative of the squeezing action of shoes 20A and 20B on the wheel drum. While use of all the pieces results in a full construction of a brake drum, this representation depicts the friction principle of the brake system.

As indicated above, the surfaces of the simulator board, the display board and at least the bases of the manipulative pieces are made from or contain a magnetically attractive material The term magnetically attractive material is intended to encompass a material that is either itself magnetic or a material that is attracted to a magnet. Thus, where the surface of the boards is magnetic, the bases of the pieces need only by of a material that is attracted to a magnet. In the simpler and preferred embodiment, the bases of the pieces have laminated thereto a section of a magnetic material such as magnetic plastic or metal, and the boards are made of material that is attractive to a magnet such as galvanized steel.

All of the above materials are most conveniently supplied housed in a compartmentalized case for easy use and storage. Thus, the educational kit includes the simulator board, the display board, the manipulative pieces, the visual slides or tapes and the audio cassette. The kit may also include student work sheets, sample tests or quizzes to be given by the instructor before and after use of the unit, and an instructor's manual.

To illustrate how the educational kit of the present invention is used, the audiovisual presentation begins with a brief discussion of general automotive brake system principles including a description of a brake system having a master cylinder, brake lines, wheel cylinders, and various brake assemblies. The construction of a master cylinder is depicted using diagrams as well as an explanation of the principles of hydraulics. The use of a hydraulic master cylinder in conjunction with brake lines which are connected up to four wheels of an automobile is articulated fully. There are further illustrations of the travel of brake fluid from a master cylinder through brake lines to the various wheel cylinders. Next, the discussion focuses on the function in components of a wheel cylinder. The student is informed about the force exerted on the two pistons of a wheel cylinder by the brake fluid emanating from the master cylinder and the subsequent pressure by the wheel cylinder pistons on link pins which in turn press brake shoes against the wheel drum. Each of the major component parts of the automotive rear brake drum system are in turn discussed and the student is shown what these parts look like by means of the visual diagrams and the accompanying audio presentation.

At various points throughout the audiovisual presentation, the student is requested to turn to the simulator board and accessory pieces associated therewith in order to physically simulate the construction and assembly of the various component parts of the automotive drum brake assembly. For example, the function of the brake shoes can be depicted by positioning pieces 20A and 20B within the wheel drum component 12 of FIG. 1 and thereafter placing the retracting springs, 22 and 25, the adjusting screw and spring, 24 and 27, and the wheel cylinder 28 in conjunction with the two shoes. Next, the relative position of the brake shoes with reference to the wheel cylinder 28 and the adjusting screw 27 can be readily appreciated by reference to the pieces within the drum 12 of the simulator board 10 in FIG. 1. A basic assembly is then completed by placement of the parking brake system within the wheel 12 of FIG. 1. Specifically, the student is directed to place the parking brake level 21, the parking brake line 23 and the parking brake cable 26 into the proper place on the simulator board 10 to show how a parking brake system works.

At this point, the student may be requested to remove all the pieces from the simulator board and reconstruct a drum brake assembly including the shoes, retracting springs, the parking brake elements, the wheel cylinder, and the adjusting screw and spring. The student is then shown exactly what a brake drum on a car looks like after removal of the wheel. The principles recently learned in the exercise undertaken with the simulator board 10 are then related to what exactly is seen with respect to the actual wheel.

The instructional means subsequently turns to a detailed discussion concerning the various subsystems of a drum brake assembly. In this regard, the student is directed to the manipulative pieces with written indicia thereon as shown in FIG. 4. For each subsystem there are manipulative pieces with specific colors. The student is then directed to a specific subsystem of the drum brake assembly as, for example, the wheel cylinder. The student is then directed to tags of a specific color with regard to said wheel cylinder and asked to place these tags with the respective arrows about the wheel cylinder element 13 in FIG. 1 to designate the respective areas corresponding to the tag. Therefore, the tag "PISTON" with its respective arrow would be placed near one of the piston elements of element 13 of FIG. 1. In this way, the student comes to appreciate the link pin, piston, and cup elements of a wheel cylinder. In the same way, the student comes to acknowledge and learn the elements of the master cylinder such as the push rod, the secondary cup, the piston, the primary cup, the pressure chamber, the compensating port, and the breathing port. And further, likewise, such elements as the anchor pin, the hold down pin and spring, the backing plate and the brake lining are all effectively learned as elements of a drum brake system.

The instruction means then goes to a full detailed discussion of a master cylinder including its component and function. Thus, a typical dual master cylinder is both illustrated by element 10 on the simulator board and an actual one shown in the visual presentation. Therefore, such element as a push rod, a brake pedal, a secondary cup, fluid seals, as well as the most important element, the piston, is fully explained. In addition, the hydraulics of the brake fluid are very clearly illustrated in the audiovisual presentation.

The above-described educational kit thus provides the student with an opportunity of exploring concepts involved in the operation of a drum brake assembly by simulating the construction in arrangements of parts involved in such a system. The educational kit is programmed such that the student will encounter a minimum of frustration and a maximum of learning efficiency during the use of the kit. Upon completion of the kit, the student should be able to identify and label correctly at least nine of the fifteen major parts of a drum brake assembly, identify at least seven of eleven major elements of a master cylinder, identify at least three of the five major parts of a wheel cylinder, indicate by means of arrows on a drum brake assembly all those parts that move in the direction in which each part moves when the brakes are applied, list the three major parts of the parking brake assembly found on the rear wheels of an automobile, and, lastly, state the relative motion of the brake drum, the backing plate and the brake assembly.

A complete description of the educational kit encompassed by the present invention may be found in the booklet entitled "Automotive Technology—Brake Systems Fundamentals" (Unit 10159-80) published as part of the Occupational Technology Series by the Xerox Corporation.

What is claimed is:

1. An educational kit for teaching the assembly, relationship of parts, and operation of an automotive drum brake system comprising:

a. a simulator board having a surface of magnetically attractive material and having (i) on a first area of said board graphic indicia on the surface thereof defining a sectional view of an automotive drum; (ii) on a second area of said board graphic indicia defining a wheel cylinder; and (iii) on a third area of said board graphic indicia defining an automotive master cylinder, all three areas of said board being educationally integratable in teaching a drum brake assembly, the indicia on said simulator board being as shown by the non-numerical indicia of FIG. 1;

b. a plurality of magnetically attractive manipulative pieces each bearing individually on their surfaces graphic indicia defining items found within an automotive drum brake assembly, said pieces comprising (i) a plurality of pieces each containing indicia defining elements found within an automotive drum brake assembly; and (ii) a plurality of pieces each containing word indicia defining various segments of an automotive drum brake system, the pieces being adapted for manipulation within the confines of the three defined areas of the simulator board, the indicia on said manipulative pieces being as shown by the non-numerical indicia of FIGS. 3 and 4;

c. a display board for said manipulative pieces including a sheet of magnetically attractive material, said display board having graphic indicia on a surface thereof in spaced relationship, said graphic indicia corresponding to the indicia present on each of said manipulative pieces, said manipulative pieces adapted for storage on and removal from said display board; and d. audiovisual instructional means for presenting information relevant to the basic principles about automotive drum brake systems including information defining (i) the first, second, and third areas of said board, (ii) the indicia on the manipulative pieces, (iii) the indicia on said board, (iv) the relationship of the indicia on the three areas of the simulator board to the indicia on said pieces and use of same on said board whereby the assembly, relationship of parts, and operation of an automotive drum brake can be learned by the user by using said board in response to said instructional means.

2. An educational kit according to claim 1 wherein said manipulative pieces are magnetic.

3. An educational kit according to claim 1 wherein said manipulative pieces comprise a flat sheet of rigid material having smaller sections of a magnetic material laminated thereto.

4. An educational kit according to claim 1 wherein the indicia depicted on said manipulative pieces comprises schematic diagrams of a drum brake syste, including brake shoes, retracting springs, a wheel cylinder, an adjusting screw and spring, and word indicia naming various of the parts of said drum brake system.

5. An educational kit according to claim 1 wherein said audio instruction means includes tape recordings which are synchronized with said visual instruction means which includes slides or filmstrips.

6. An educational kit according to claim 1 wherein said instruction means includes a plurality of student work sheets, said work sheets being adapted for use by the student to record information and test the student in response to said audiovisual instruction means.

7. An educational kit according to claim 1 wherein said simulator board, said manipulative pieces, and said display board are constructed of a substantially rigid material.

8. An educational kit according to claim 1 further comprising a compartmentalized case, said case being adapted for storage of said kit.

* * * * *